(12) United States Patent
Wormald (10) Patent No.: US 9,864,628 B2
(45) Date of Patent: Jan. 9, 2018

(54) METHOD AND SYSTEM FOR TRANSFERRING AN APPLICATION STATE FROM A FIRST ELECTRONIC DEVICE TO A SECOND ELECTRONIC DEVICE

(75) Inventor: Christopher R. Wormald, Kitchener (CA)

(73) Assignee: BlackBerry Limited, Waterloo (CA)

( * ) Notice: Subject to any disclaimer, the term of this patent is extended or adjusted under 35 U.S.C. 154(b) by 608 days.

(21) Appl. No.: 11/208,732

(22) Filed: Aug. 23, 2005

(65) Prior Publication Data

US 2007/0054627 A1  Mar. 8, 2007

(51) Int. Cl.
  *H04B 1/00* (2006.01)
  *H04B 7/00* (2006.01)
  *G06F 9/46* (2006.01)
  *G06F 9/48* (2006.01)

(52) U.S. Cl.
  CPC ............ *G06F 9/461* (2013.01); *G06F 9/4856* (2013.01)

(58) Field of Classification Search
  CPC ......... H04W 4/12; H04W 12/06; H04M 1/73; H04B 7/18536; H04N 21/43637
  USPC ........................................................ 455/517
  See application file for complete search history.

(56) References Cited

U.S. PATENT DOCUMENTS

| 5,805,846 | A | 9/1998 | Nakajima et al. |
| 5,996,073 | A | 11/1999 | Lee et al. |
| 7,277,947 | B1* | 10/2007 | Van De Sluis et al. ...... 709/227 |
| 7,315,747 | B2* | 1/2008 | Klassen et al. ............... 455/466 |
| 2003/0167318 | A1* | 9/2003 | Robbin et al. ................ 709/221 |
| 2003/0217166 | A1* | 11/2003 | Dal Canto et al. ........... 709/229 |
| 2003/0220121 | A1* | 11/2003 | Konishi et al. ............... 455/519 |
| 2004/0171396 | A1* | 9/2004 | Carey et al. .................. 455/466 |
| 2004/0236974 | A1 | 11/2004 | Brown et al. |
| 2005/0022113 | A1 | 1/2005 | Hanlon |
| 2005/0038933 | A1 | 2/2005 | Himmel et al. |
| 2005/0261062 | A1* | 11/2005 | Lewin et al. ................... 463/42 |
| 2006/0111099 | A1* | 5/2006 | Abdel-Kader ................ 455/421 |
| 2006/0153198 | A1* | 7/2006 | Chadha ...................... 370/395.2 |

FOREIGN PATENT DOCUMENTS

| EP | 1215575 A | 6/2002 |
| EP | 1062598 B1 | 10/2003 |
| WO | WO 00/34891 A | 6/2000 |
| WO | 2004030384 | 4/2004 |
| WO | 1 420 388 A | 5/2004 |

OTHER PUBLICATIONS

Apple Comp Inc: "Apple—iTunes—Sync with iPod" Discover iTunes, Aug. 2004 (Aug. 2004), XP002360243 * the whole document *.

(Continued)

*Primary Examiner* — Ankur Jain
(74) *Attorney, Agent, or Firm* — Ridout and Maybee LLP (57) ABSTRACT

The present invention provides a method for transferring an application state, of a first application being executed on a first electronic device, from the first electronic device to a second electronic device that is coupled to communicate with the first electronic device. The method comprises transmitting at least one application state element to the second electronic device and executing a second application on the second electronic device according to the application state elements.

18 Claims, 4 Drawing Sheets

(56) References Cited

OTHER PUBLICATIONS

Wikipedia: "ITunes" Wikipedia, May 10, 2005 (May 10, 2005), XP002327815 * the whole document *.
Intellectual Property Office India, Office Communication dated Apr. 15, 2011, issued in respect of Indian Patent Application No. 1900/DEL/2006.
Anand and Anand, Response to Office Communication, filed Jun. 1, 2011, in respect of Indian Patent Application No. 1900/DEL/2006.
Wang, Wei, Canadian Intellectual Property Office, Examiner's Requisition, Dec. 20, 2010, Canada.
Canadian Intellectual Property Office, Examiner's Requisition dated Jan. 26, 2010, issued in respect of Canadian Patent Application No. 2,557,030.
Ogilvy Renault, Response to Examiner's Requisition dated Jul. 21, 2010, filed in respect of in respect of Canadian Patent Application No. 2,557,030.
Norton Rose, Response to Examiner's Requisition dated Jun. 3, 2011, filed in respect of in respect of Canadian Patent Application No. 2,557,030.
Canadian Intellectual Property Office, Examiner's Requisition dated Jan. 18, 2012, issued in respect of Canadian Patent Application No. 2,557,030.
Norton Rose, Response to Examination Report dated Jul. 18, 2012, filed in Canadian Patent Application No. 2,557,030.
Canadian Intellectual Property Office, Examiner's Requisition dated Dec. 23, 2013, issued in Canadian Patent Application No. 2,557,030.
European Patent Office, "Communication Pursuant to Article 94(3) EPC" for corresponding European Patent Application No. 08 165 116.8 dated Aug. 24, 2015.

* cited by examiner

METHOD AND SYSTEM FOR TRANSFERRING AN APPLICATION STATE FROM A FIRST ELECTRONIC DEVICE TO A SECOND ELECTRONIC DEVICE

FIELD OF THE INVENTION

This invention relates to the field of software applications and specifically to transferring an application state from a first electronic device to a second electronic device.

BACKGROUND OF THE INVENTION

Mobile electronic devices are becoming more and more ubiquitous because they help users manage their busy schedules and communicate with the world, as well as provide users with entertainment. For example, portable computers, such as notebook or laptop computers, personal data assistants (PDAs) and mobile telephones are becoming necessities for many. Notebook or laptop computers are very popular because they are extremely lightweight personal computers that can easily fit in a briefcase for the mobile businessperson. A PDA is a handheld mobile device that allows users to access information, keep track of their busy schedules, and communicate with others. A typical PDA can function as a mobile or cellular phone, fax sender, and personal organizer. Furthermore, many PDAs are capable of wireless connectivity and executing any number of software applications. It is very important for today's mobile professional to be able to access information from anywhere in the world. Similar to the portable computer, PDAs are very popular because they are designed to be highly portable. Some mobile electronic devices have entertainment functions and include MP3 players, such as the Apple iPod™ and handheld game consoles such as the Nintendo Gameboy™ line of products or Sony PlayStation Portable™.

A common feature of portable devices, such as a PDA, is the ability for the mobile device to communicate with another electronic device, such as a desktop computer, laptop or another PDA, for the purposes of synchronizing various data. Typically, the PDA is coupled to communicate with the desktop computer, either wirelessly or through a serial port. When instruction from a user to synchronizing the devices is received, data such as contacts, e-mail, calendar items, memo items are synchronized by replacing old data with newer data. There are numerous computer software designed to synch two electronic devices and ensure that the newer data is retained and not overwritten by older data.

Synching two electronic devices is typically limited only to the data elements described above. As a result, if a user decides to leave a first device, such as a desktop, while running a particular application and desires to continue working from a second device such as a PDA, that user will typically start the application from the PDA and start over again. For example, if the user is browsing the World Wide Web and wishes to continue browsing on a PDA, the user would start the browser on the PDA and enter the URL and start over.

Methods for providing improved functionality between multiple devices is desired.

SUMMARY OF THE INVENTION

According to one broad aspect of the invention, there is provided a method for transferring an application state, of a first application being executed on a first electronic device, from the first electronic device to a second electronic device that is coupled to communicate with the first electronic device. The method comprises transmitting at least one application state element to the second electronic device and commencing execution of a second application on the second electronic device according to the application state elements.

Depending on the specific application and situation, it may be preferable to terminate the first application being executed by the first electronic device.

Advantageously, the methods of the present invention provide for the transfer of an application state from a first device to a second device so that a user may continue his or her electronic activities in a more seamless manner.

According to another aspect of the invention, there is provided a computer readable memory storing statements and instructions for use in the execution in a computer of the methods of the present invention. Preferably, the computer readable memory is in a mobile electronic device.

According to another aspect of the invention, there is provided a data carrier product containing sequences of instructions which when executed causes the performance of the methods of the invention.

According to another aspect of the invention, there is provided a software product containing sequences of instructions which when executed causes the performance of the methods of the invention.

According to another aspect of the invention, there is provided an integrated circuit product containing sequences of instructions which when executed causes the performance of the methods of the invention.

BRIEF DESCRIPTION OF THE DRAWINGS

Embodiments of the invention may best be understood by referring to the following description and accompanying drawings. In the description and drawings, like numerals refer to like structures or processes. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known software, circuits, structures and techniques have not been described or shown in detail in order not to obscure the invention.

The advantages of the present invention are further illustrated by examples. The examples and their particular details set forth herein are presented for illustration only and should not be construed as a limitation on the claims of the present invention.

Method.

Generally, in accordance with an aspect of the invention, there is provided methods for transferring an application state, of a first application being executed on a first electronic device, from the first electronic device to a second electronic device. The second device is coupled to communicate with the first device. It will be understood by a person skilled in the art that coupled communication may be a direct connection through USB or similar ports between the first and second device, wirelessly or a combination thereof. It will be further understood that the two devices may be coupled to communicate indirectly through a network, preferably wirelessly. The first and second devices may be any electronic device capable of executing an application such as a personal computer, laptop or PDA, but is not limited to devices capable of running multiple applications. The first and second devices may therefore also include, without limitation, mp3 players, portable media players, gaming consoles or electronic book readers.

Figure 1:
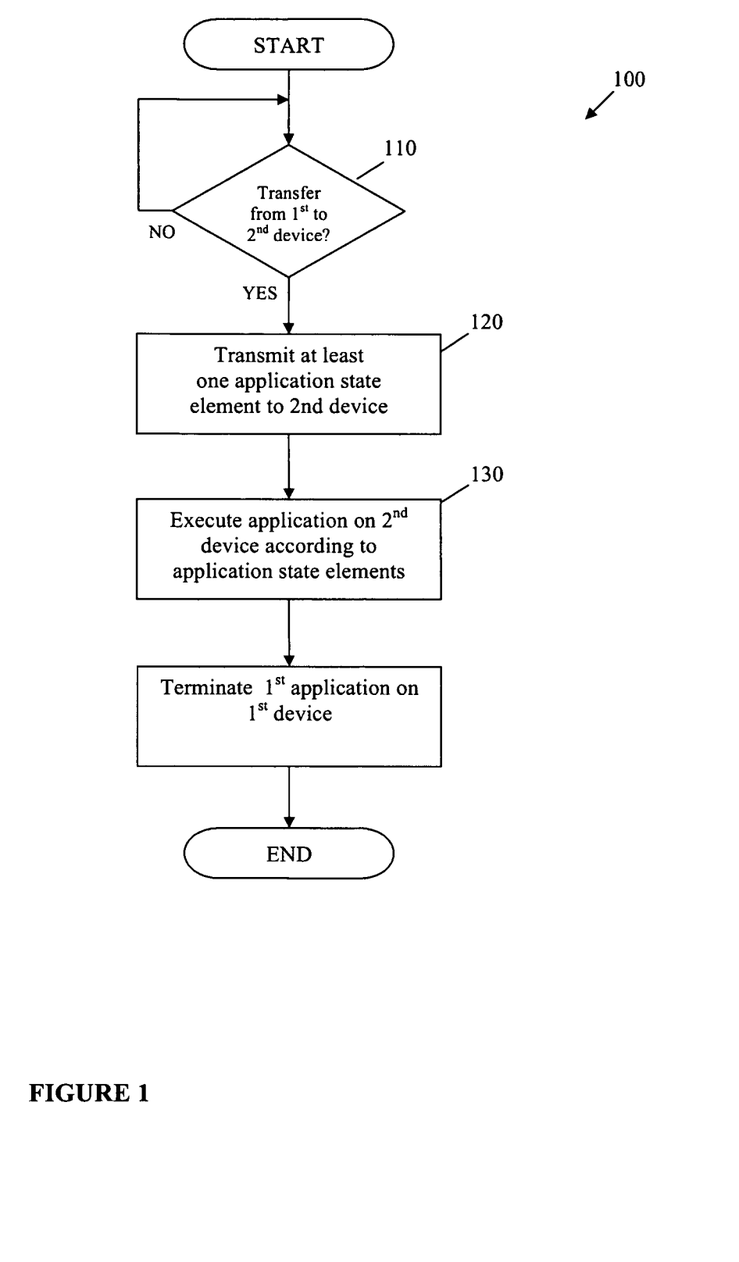
FIG. 1 is a flowchart illustrating operations for transferring an application state of an application from a first electronic device to a second electronic device according to a first embodiment of the invention.

Referring to FIG. 1, a flowchart illustrating operations 100 according to a first embodiment of the invention is provided. A decision at step 110 is made by a user to transfer the application state from a first device to a second device. At step 120, at least one application state element is transmitted to the second device. At step 130 a second application is executed on the second device according to the application state elements. At step 140, the first application on the first device is terminated.

Example 1—Media

A user is listening to music media, such as a song, in mp3 format using a media player, such as Windows Media Player™ or Apple's iTunes™, executed from a desktop personal computer. The user also has a mobile mp3 player, such as an Apple iPod™ or Diamond RIO™, that is connected to the desktop computer. Alternatively, a user may have a PDA with a media player application capable of playing mp3s. Upon the user indicating a desire to switch to the mobile device by choosing "Switch to PDA", application state elements regarding the media player's application state are transmitted from the desktop computer to the mp3 player. Application state elements in this example include, but are not limited to, any of a song file being played, an elapsed time on the song, a playlist and a shuffle order. The media player application on the mp3 player would be then be executed according to the application state elements and the original media player on the desktop terminated. As a result, the same song which was originally playing on the user's desktop will begin playing on the mp3 player from the same moment. Further, the media player's playlist and shuffle order would also be preserved. Advantageously, this provides a more seamless transition from a first device (desktop) to a second device (mp3 player).

Although the first application executed from the first device is preferably the same application as the second application executed from the second device, it is possible to use different applications to transfer the same task. For example, the user may be using Windows Media Player™ to listen to an mp3 on the first device but using Winamp™ to listen to the mp3 on the second device. Further, it is also known to use middleware to resolve potential incompatibility issues between the first and second applications on the first and second devices respectively.

In another embodiment of the invention, the first and second devices are both portable media players and application state elements are transferred there between. This allows two portable media players to be synchronized so that two individuals may listen to the same songs at the same time and in the same order. For example, A first mobile mp3 player is coupled to communicate with a second mobile mp3 player. At the direction of a user to "Transfer State", application state elements from the first mp3 player are transferred to the second mp3 player. The media player application on the second mp3 player would then be executed according to the application state elements. Thus, the first and second mobile mp3 players would be playing the same media in the same order at the same time. As a result, respective first and second users would be provided with a synchronized experience.

The methods of the present invention are equally applicable to streaming media. In this instance, as a media file is streamed from a remote location, application state elements for the streaming media would additionally include the URL or location of the media file sufficient to enable the second device to start the streaming of the media file to the second device. As with non-streaming media, other application state elements, such as elapsed play time, would be provided to the second device to facilitate a more seamless transfer of application state. It will also be understood that any of the streaming media or data regarding the elapsed playtime may involve instructing a remote third device to stream the media to the second device starting at the elapsed playtime.

In some embodiments of the invention, when the second application on the second device has been executed according to the application state elements, that is, the same media is playing from the same point in time, there is a pause for a predetermined period of time before terminating the first application. Thus, for this predetermined period of time, the media is played simultaneously from both devices. Advantageously, this prevents the user from missing any media after the transfer but before using the second device, for example, by putting on headphones. In the case of media that is streamed from a server, the server authenticates both devices and facilities the transfer of application state by multicasting to both devices for the predetermined period of time. In another embodiment, the first application will continue indefinitely until the user terminates it manually.

It will be understood by a person skilled in the art that application state elements may include any authentication information required to transfer the application state from the first device to the second device. For example, streaming media may only be available following authentication of a user. Further, if application level synching of streaming media is not available, it will be understood that middleware, of a type known in the art, may be employed to synch the elapsed playtime of the media on the first device with the media on the second device.

Example 2—Web Browsing

A user is browsing the World Wide Web from a PDA, such as a BlackBerry™, available from Research in Motion Ltd. (RIM), using the BlackBerry's™ native web browser and has arrived at a desktop work station and wishes to transfer the application state to the desktop. The user couples the PDA to communicate with the desktop personal computer and chooses to "Switch to PC". All application state elements required to transfer the application state of the web browser from the PDA to the PC is transmitted from the PDA to the PC, such as the URL and any required cookies.

Preferably, the application state elements include the actual location on the web page. The personal computer then executes a web browser, such as Microsoft's Internet Explorer™ or Mozilla's Firefox™ according to the transmitted application state elements. The web browser on the personal computer therefore opens the same URL at the same place facilitating a continuous experience with the user's current activity—reading, enabling a transaction or playing an online game for example.

Example 3—Electronic Books

A user is reading an electronic book (e-book) on a desktop computer and wishes to transfer the application state to a PDA. The user couples the PDA to communicate with the desktop personal computer and chooses "Switch to PDA". All application state elements required to transfer the application state of the electronic book is transmitted from the PDA to the PC, such as the entire or the relevant portion of an electronic book file or a link to it and the last location within the e-book which was displayed. The personal computer then executes an appropriate application capable of reading the e-book file according to the transmitted application state elements. The user can then continue reading from the same location in the e-book on the PDA.

Figure 2:
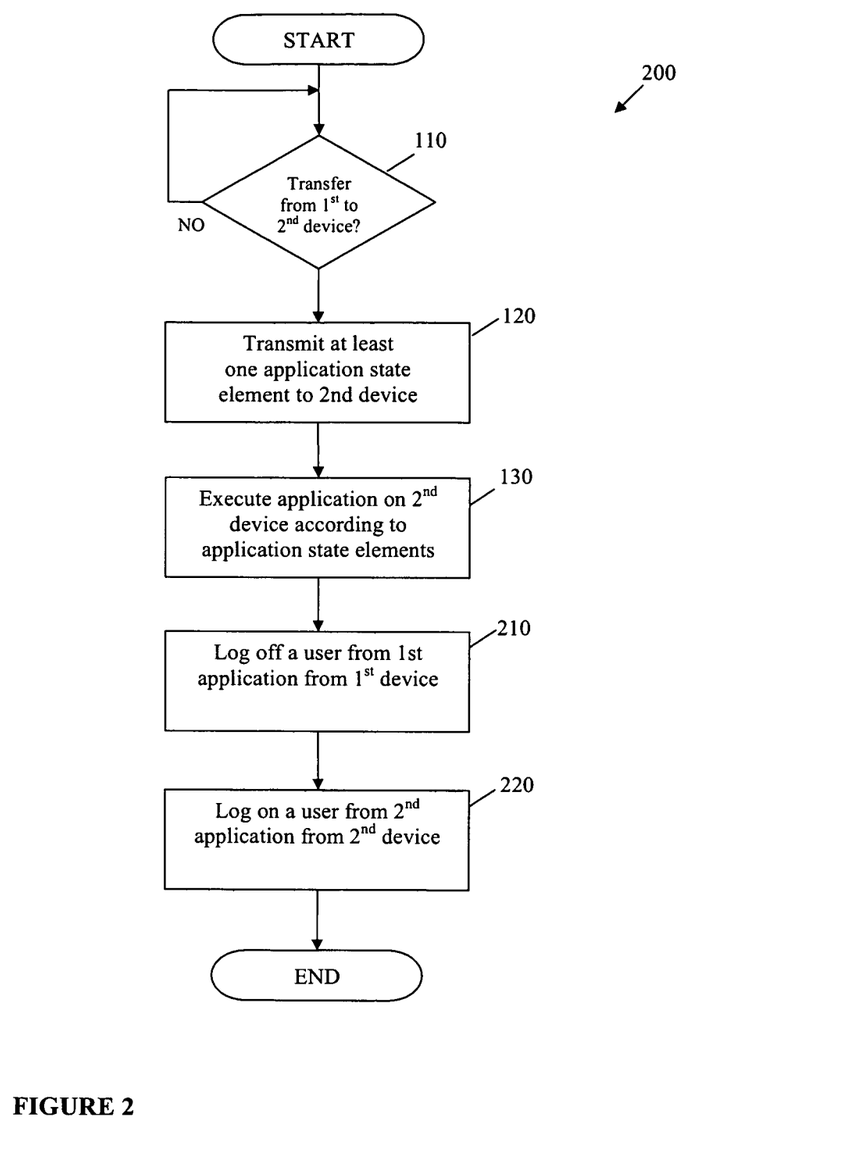
FIG. 2 is a flowchart illustrating operations for transferring an application state of an application from a first electronic device to a second electronic device according to a second embodiment of the invention.
Figure 3:
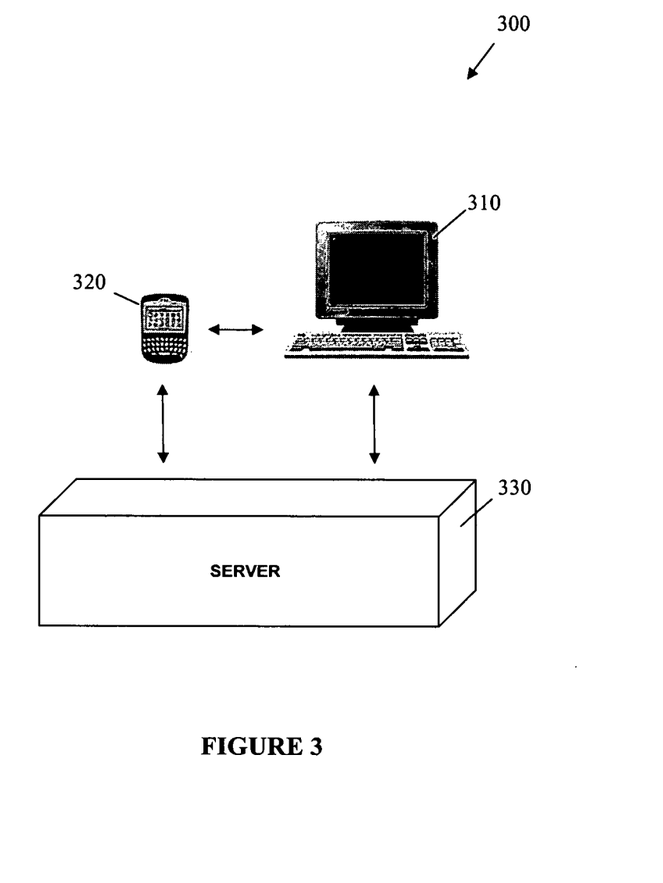
FIG. 3 is a schematic showing a system for transferring an application state of an application from a first electronic device to a second electronic device according to the second embodiment of the invention.

Referring to FIG. 2, operations 200 for transferring an application state from a first device to a second device according to a second embodiment of the invention are shown. Some applications are coordinated through, and may require a user to log into, an application server. Operations 200 contain additional steps 210 and 220. At step 210, a user is logged off the first application from the first device. At step 220, the user is logged on the second application from the second device. Referring to FIG. 3, instructions representing operations 200 can be stored and executed on one of any of a desktop computer 310, a personal data assistant 320 and an application server 330, alone or in combination, in system 300. In system 300, each of desktop computer 310, personal data assistant 320 and application server 330 are coupled to communicate with each other.

Example 4—Instant Messaging

Instant Messaging ("IM") typically requires a user to be logged in to an application server. A user is logged in to an instant messaging system from a desktop computer and instant messaging several contacts. Upon deciding to leave the desktop computer and switch the application over to a PDA, which is coupled to communicate with the desktop, the user chooses a "Switch to PDA" option. Application state elements relating to the instant messenger are transmitted from the desktop to the PDA. Application state elements in this embodiment of the invention may include conversation logs, open conversations and log-in status. The instant messenger application is then executed from the PDA according the transmitted application state elements. The instant messenger on the PDA will therefore show open conversations with the same contacts with the same conversation histories. Further, the user will have the same log-in status such as, for example, any one of "online", "offline", "invisible", "away", "busy" and "do not disturb". The user is then logged off of the instant messenger application from the desktop computer and logged in to the instant messenger application from the PDA. A user therefore experiences a transition of application state from the desktop to the PDA while continuing to instant message his/her contacts.

It will be understood that depending on the instant messenger application, some application state elements may not be implemented until after the user has logged in from the second device. In these instances, application state elements will be implemented by the second device following logging into the application server.

Although the application state elements are described as being transmitted from the desktop computer to the PDA, it will be understood that with respect to applications that involve a separate application server, it is also possible for application state elements, that are resident on the application server, to be downloaded therefrom.

In one embodiment of the invention, a user's IM contacts or "buddies" do not see a change in the user's online status. A person skilled in the art would understand that this could be achieved by various means. For example, once the "Switch to PDA" option has been selected, in addition to the transfer of application state elements described above, the application server maintains the online status of the user despite the user being temporarily disconnected. Any messages directed to the user during this time may be temporarily stored in a memory and then sent to the second device once the second device has logged in the application server.

In another embodiment of the invention, the IM application server is disposed to automatically attempt to "Switch to PDA" if connection to the user's personal computer is lost, for example, as a result of the user logging off or shutting down the personal computer.

Although the methods of the invention have been described with respect to only one application state being transferred from a first device to a second device. A person skilled in the art would understand that the states of multiple applications may be transmitted from the first device to a second device. For example, application state elements regarding both web browsing and a media player could be transferred and the user would be able to seamlessly continue web browsing and listening to the same song from a second device.

The methods of the present invention have been described with reference to particular examples of types of software applications but are not limited thereto. The methods may be employed to transfer the application state of any application from a first electronic device to a second electronic device. For example, operations 100, or operations 200 if connection to a remote game server is required, would allow the transfer of a game from a first electronic device, such as a desktop, to a second electronic device, such as a PDA or a handheld game console.

Device.

Figure 4:
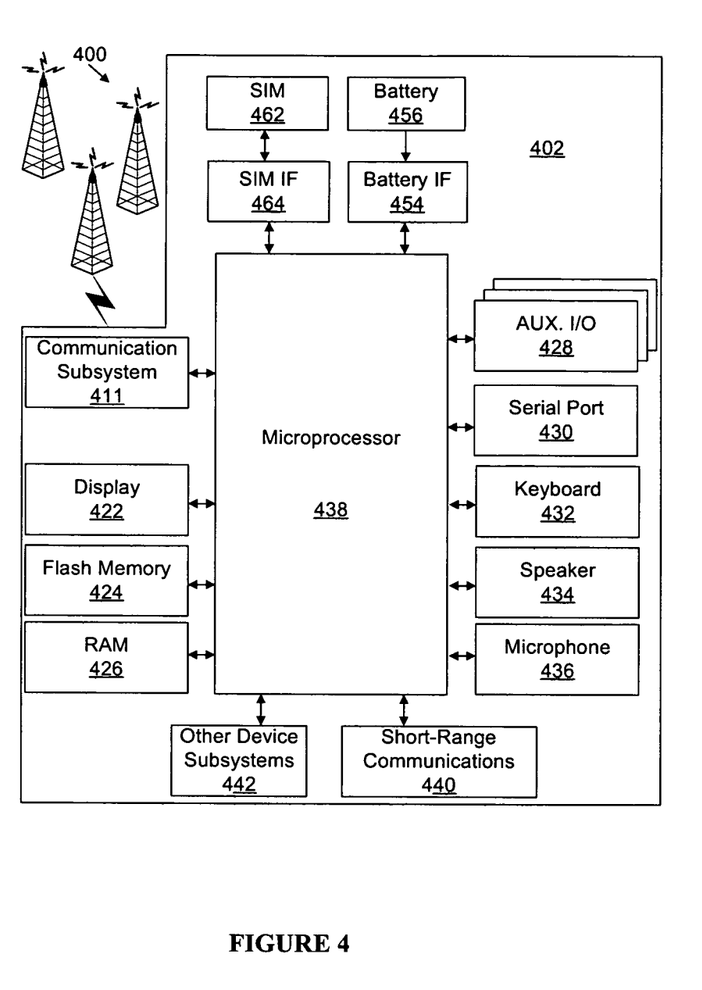
FIG. 4 shows a mobile electronic device storing instructions which when executed causes the performance of the methods of the present invention.

Referring to FIG. 4, a mobile electronic device 402 capable of executing instructions representing the methods of the present invention is shown. The mobile electronic device 402 is preferably a two-way communication device having at least voice and advanced data communication capabilities, including the capability to communicate with other computer systems. Depending on the functionality provided by mobile electronic device 402, it may be referred to as a data messaging device, a two-way pager, a cellular telephone with data messaging capabilities, a wireless Internet appliance, or a data communication device (with or without telephony capabilities). Mobile electronic device 402 may communicate via a network 400, in this embodiment, any one of a plurality of fixed transceiver stations within its geographic coverage area.

Mobile electronic device 402 will normally incorporate a communication subsystem 411, which includes a receiver, a transmitter, and associated components, such as one or more (preferably embedded or internal) antenna elements and, local oscillators (LOs), and a processing module such as a digital signal processor (DSP) (all not shown). Communication subsystem 411. As will be apparent to those skilled in field of communications, particular design of communication subsystem 411 depends on the communication network in which mobile electronic device 402 is intended to operate. In this embodiment of the invention communication subsystem 411 includes a receiver configured to receive data from a positioning system 470 to accurately determine the global position of mobile electronic device 402.

Network access is associated with a subscriber or user of mobile electronic device 402 and therefore mobile electronic device 402 requires a Subscriber Identity Module or "SIM" card 462 to be inserted in a SIM IF 464 in order to operate in the network. Mobile electronic device 202 is a battery-powered device so it also includes a battery IF 454 for receiving one or more rechargeable batteries 456. Such a battery 456 provides electrical power to most if not all electrical circuitry in mobile electronic device 402, and battery IF 454 provides for a mechanical and electrical connection for it. The battery IF 454 is coupled to a regulator (not shown) which provides power V+ to all of the circuitry.

Mobile electronic device 402 includes a controller such as a microprocessor 438 which controls overall operation of mobile electronic device 402. Communication functions, including at least data and voice communications, are performed through communication subsystem 411. Microprocessor 438 also interacts with additional device subsystems such as a display 422, a backlight 423 for illuminating display 422, a flash memory 424, a random access memory (RAM) 426, auxiliary input/output (I/O) subsystems 428, a serial port 430, a keyboard 432, a speaker 434, a microphone 436, a short-range communications subsystem 440, and any other device subsystems generally designated at 442. Microprocessor is also capable of adjusting the intensity of backlight 420 according to a state of at least one light condition affecting ambient light at the global position of the device. Some of the subsystems shown in FIG. 4 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list. Operating system software used by microprocessor 438 is preferably stored in a persistent store such as flash memory 424, which may alternatively be a read-only memory (ROM) or similar storage element (not shown). Those skilled in the art will appreciate that the operating system, specific device applications, or parts thereof, may be temporarily loaded into a volatile store such as RAM 426.

Microprocessor 438, in addition to its operating system functions, preferably enables execution of software applications on mobile electronic device 402. A predetermined set of applications which control basic device operations, including at least data and voice communication applications, will normally be installed on mobile electronic device 402 during its manufacture. A preferred application that may be loaded onto mobile electronic device 402 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile electronic device 402 and SIM 462 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile electronic device user's corresponding data items stored and/or associated with a host computer system thereby creating a mirrored host computer on mobile electronic device 402 with respect to such items. This is especially advantageous where the host computer system is the mobile electronic device user's office computer system. Additional applications may also be loaded onto mobile electronic device 402 through network 400, an auxiliary I/O subsystem 428, serial port 430, short-range communications subsystem 440, or any other suitable subsystem 442, and installed by a user in RAM 426 or preferably a non-volatile store (not shown) for execution by microprocessor 438. Such flexibility in application installation increases the functionality of mobile electronic device 402 and may provide enhanced on-device functions, communication-related functions, or both. For example, secure communication applications may enable electronic commerce functions and other such financial transactions to be performed using mobile electronic device 402.

In a data communication mode, a received signal such as a text message, an e-mail message, or web page download will be processed by communication subsystem 411 and input to microprocessor 438. Microprocessor 438 will preferably further process the signal for output to display 422, to auxiliary I/O device 428 or both. A user of mobile electronic device 402 may also compose data items, such as e-mail messages, for example, using keyboard 432 in conjunction with display 422 and possibly auxiliary I/O device 428. Keyboard 432 is preferably a telephone type keypad, full alphanumeric keyboard or full or condensed QWERTY keypad. These composed items may be transmitted over a communication network through communication subsystem 411.

For voice communications, the overall operation of mobile electronic device 402 is substantially similar, except that the received signals would be output to speaker 434 and signals for transmission would be generated by microphone 436. Alternative voice or audio I/O subsystems, such as a voice message recording subsystem, may also be implemented on mobile electronic device 402. Although voice or audio signal output is preferably accomplished primarily through speaker 434, display 422 may also be used to provide an indication of the identity of a calling party, duration of a voice call, or other voice call related information, as some examples.

Serial port 430 in FIG. 4 is normally implemented in a personal digital assistant (PDA)-type communication device for which synchronization with a user's desktop computer is a desirable, albeit optional, component. Serial port 430 enables a user to set preferences through an external device or software application and extends the capabilities of mobile electronic device 402 by providing for information or software downloads to mobile electronic device 402 other than through a wireless communication network. The alternate download path may, for example, be used to load an encryption key onto mobile electronic device 402 through a direct and thus reliable and trusted connection to thereby provide secure device communication.

Short-range communications subsystem 440 of FIG. 4 is an additional optional component which provides for communication between mobile electronic device 402 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile electronic device 402 is configured for sending and receiving data items and includes a PIM for organizing and managing data items relating to the user such as, but not limited to, instant messaging (IM), e-mail, calendar events, calendar appointments, and task items, etc. By way of example, mobile electronic device 402 is configured for voice (which may include push to talk over cellular (POC)) and data services, voice mail service, e-mail service, SMS and chat services to which the user subscribes. To provide a user-friendly environment to control the operation of mobile electronic device 402, PIM together with the operation system and various software applications resident on the station 402 provides a GUI having a main screen from which to access various services via applications stored on said device or available to it.

Some or all the instructions representing the methods of the present invention may be stored in any of the memory stores described above and executed by microprocessor 438. Mobile electronic device 402 may act as either the first or second device of the present invention and it will be clear to a person skilled in the art that transmission of the application state elements can be accomplished by push to or pull from the other device. Similarly, instructions relating terminating the first application on the first device or conversely, executing the second application on the second device may both originate from microprocessor 438 on mobile electronic device 402 and cause further execution by a microprocessor on the other device.

Data Carrier Product.

The sequences of instructions which when executed cause the methods described herein to be performed by system 500 can be contained in a data carrier product for transmission such as embodied in a carrier wave according to one embodiment of the invention.

Computer Software Product.

The sequences of instructions which when executed cause the methods described herein to be performed by system 500 can be contained in a computer software product according to one embodiment of the invention. This computer software product can be loaded into and run by system 500.

Integrated Circuit Product.

The sequences of instructions which when executed cause the methods described herein to be performed by system 500 can be contained in an integrated circuit product including a coprocessor or memory according to one embodiment of the invention. This integrated circuit product can be installed in system 500.

Although preferred embodiments of the invention have been described herein, it will be understood by those skilled in the art that variations may be made thereto without departing from the spirit of the invention or the scope of the appended claims.

The invention claimed is:

1. A method for managing an application state by an instant messaging application server coupled to a first electronic device and a second electronic device for communication therewith, the method comprising:
   maintaining by the instant messaging application server an application state associated with an instant messaging account logged into from a first instance of an instant messaging application executing on the first electronic device, wherein the application state is defined application state elements comprising a conversation log, an open conversation and an online status;
   detecting by the instant messaging application server that communication with the first electronic device has been lost; and
   automatically transferring the application state from the instant messaging application server to the second electronic device in response to detecting that the communication with the first electronic device has been lost, the automatically transferring including
      transmitting the application state elements from the instant messaging application server to the second electronic device,
      causing the logging out of the instant messaging account at the instant messaging application server,
      causing a second instance of the instant messaging application to be executed on the second electronic device, causing logging into the instant messaging account at the instant messaging application server from the second electronic device after the automatically transferring is performed, and
      wherein the instant messaging application server maintains the online status of the instant messaging account while automatically transferring the application state to the second electronic device.

2. The method of claim 1, wherein instant messages addressed to a user of the instant messaging account are stored by the instant messaging application server and sent after logging into the instant messaging application from the second electronic device.

3. The method of claim 1, wherein the application state elements include authentication information for transferring the application state to the second electronic device.

4. The method of claim 1, wherein the first electronic device is directly coupled to communicate with the second electronic device via a direct connection between respective ports on the first and second electronic devices and the transferring is performed via the direct connection.

5. The method of claim 4, wherein the first electronic device is additionally adapted to be coupled to the second electronic device via a wireless communication network and the transferring is performed via the wireless communication network.

6. The method of claim 1, wherein the first electronic device is adapted to be coupled to the second electronic device via a wireless communication network and the transferring is performed via the wireless communication network.

7. An instant messaging application server, the instant messaging application server coupled to a first electronic device and a second electronic device for communication therewith, comprising:
   a processor;
   a memory coupled to the processor, the memory storing executable instructions that, when executed by the processor, cause the instant messaging application server to:
      maintain an application state associated with an instant messaging account logged into from a first instance of an instant messaging application executing on the first electronic device, wherein the application state is defined application state elements comprising a conversation log, an open conversation and an online status;

detect that communication with the first electronic device has been lost; and automatically transfer the application state from the instant messaging application server to the second electronic device in response to the detecting that the communication with the first electronic device is lost, the automatically transferring including transmitting the application state elements from the instant messaging application server to the second electronic device, causing the logging out of the instant messaging account at the instant messaging application server, causing a second instance of the instant messaging application to be executed on the second electronic device, causing logging into the instant messaging account at the instant messaging application server from the second electronic device after the automatically transferring is performed, and wherein the instant messaging application server maintains the online status of the instant messaging account while automatically transferring the application state from the first electronic device to the second electronic device.

8. The instant messaging application server of claim 7, wherein the processor is configured to execute instructions to further cause the instant messaging application server to store instant messages addressed to a user of the instant messaging account and send the stored instant messages after the second electronic device is logged into the instant messaging application.

9. The instant messaging application server of claim 7, wherein the application state elements include authentication information for transferring the application state to the second electronic device.

10. The instant messaging application server of claim 7, wherein the first electronic device is directly coupled to communicate with the second electronic device via a direct connection between respective ports on the first and second electronic devices and the transfer is performed via the direct connection.

11. The instant messaging application server of claim 10, wherein the first electronic device is additionally adapted to be coupled to the second electronic device via a wireless communication network and the transfer is performed via the wireless communication network.

12. The instant messaging application server of claim 7, wherein the first electronic device is adapted to be coupled to the second electronic device via a wireless communication network and the transfer is performed via the wireless communication network.

13. A non-transitory machine readable medium having tangibly encoded thereon executable instructions that, when executed by a processor of an instant messaging application server, the instant messaging application server coupled to a first electronic device and a second electronic device for communication therewith, cause the instant messaging application server to:

maintain an application state associated with an instant messaging account logged into from a first instance of an instant messaging application executing on the first electronic device, wherein the application state is defined application state elements comprising a conversation log, an open conversation and an online status;

detect that communication with the first electronic device has been lost; and automatically transfer the application state from the instant messaging application server to the second electronic device in response to the detecting that communication with the first electronic device is lost, the automatically transferring including transmitting the application state elements from the instant messaging application server to the second electronic device, causing the logging out of the instant messaging account at the instant messaging application server, causing a second instance of the instant messaging application to be executed on the second electronic device, causing logging into the instant messaging account at the instant messaging application server from the second electronic device after the automatically transferring is performed, and wherein the instant messaging application server maintains the online status of the instant messaging account while automatically transferring the application state from the first electronic device to the second electronic device.

14. The non-transitory machine readable medium of claim 13, wherein the instructions further cause the instant messaging application server to store instant messages addressed to a user of the instant messaging account and send the stored instant messages after the second electronic device is logged into the instant messaging application.

15. The non-transitory machine readable medium of claim 13, wherein the application state include authentication information for transferring the application state to the second electronic device.

16. The non-transitory machine readable medium of claim 13, wherein the first electronic device is directly coupled to communicate with the second electronic device via a direct connection between respective ports on the first and second electronic devices and the transfer is performed via the direct connection.

17. The non-transitory machine readable medium of claim 16, wherein the first electronic device is additionally adapted to be coupled to the second electronic device via a wireless communication network and the transfer is performed via the wireless communication network.

18. The non-transitory machine readable medium of claim 13, wherein the first electronic device is adapted to be coupled to the second electronic device via a wireless communication network and the transfer is performed via the wireless communication network.

* * * * *